Patented Apr. 4, 1944

2,345,828

UNITED STATES PATENT OFFICE 2,345,828

SEWAGE TREATMENT

Hubert L. Olin, Iowa City, Iowa

No Drawing. Application November 5, 1937,
Serial No. 172,956

1 Claim. (Cl. 210—2)

This invention relates to the treatment of sewage and particularly to the purification of sewage so as to separate therefrom a purified effluent which can be delivered into natural water courses without nuisance.

According to the present invention the sewage is treated with highly colloidal clay for the production of a floc throughout the sewage. The floc is separated, preferably by gravity, and the effluent is run off in purified condition. The sewage may be subjected to sedimentation to remove solids and gross matters from the effluent which is then treated with the highly colloidal clay. I have discovered that this is not necessary, because the settlement of the floc and the sedimentation of the solid and gross matters may occur simultaneously and the presence of the solids and gross matters does not appear to have any bearing upon the purifying effect of the floc upon the effluent. The sewage may be subjected to screening or comminution, in well known manner, before the flocculating purification.

By the term "highly colloidal clay of the swelling bentonite type" I intend to define clays which have considerable gel or sol forming properties and which can be flocculated by electrolytes. I prefer to employ bentonites of the type produced in the vicinity of the Black Hills of Wyoming and South Dakota which are capable of forming thick gels at least ten times the volume of the original bentonite.

In view of the fact that considerable laxity has arisen in the use of the term "bentonite" and the fact that that term has been extended to include fuller's earth and other clays which have practically no gel forming properties, I find it necessary to define the type of bentonite I employ, and which I refer to as "highly colloidal clay of the swelling bentonite type," more particularly.

As I have stated, they form thick gels with water, which are at least ten times the volume of the original bentonite. Suspensions of 2% of my bentonite remain dispersed indefinitely. A sol containing about 10% of bentonite and 90% of water is of such consistency that it flows only with difficulty under a head of about one foot through a six-inch section of one-half inch pipe.

The bentonite which is suitable for my process has an alkali content which is predominantly sodium, or in some cases potassium. The bentonite, in which alkali metal, particularly sodium, preponderates over calcium, and to which I have referred above as "highly colloidal clay of the swelling bentonite type," commonly is designated as sodium bentonite. I have found that bentonites of very similar appearance, which have an alkali content predominately calcium, are not suitable for my process, since they lack sufficient colloidal and gel forming properties to fall within my term "highly colloidal clay." I attribute the remarkable dispersive properties of bentonites from the locations specified as due largely to the small particle size. Thus, over 90% of such highly colloidal clay has a particle size of less than 0.001 mm.

Although the dispersoid in a sodium bentonite hydrosol is highly hydrated, and in this respect behaves like an emulsoid, it is suspensiod in character, being sensitive to the presence of more than inappreciable quantities of electrolytes, which cause its ultramicroscopically dispersed particles to aggregate and to flock out of solution. The flocs, however, retain large quantities of water of hydration. This property renders bentonite flocs uniquely effective in entraining, agglutinating or enmeshing sewage dispersiods with which they may come in contact.

In the present invention I have taken advantage of characteristics peculiar to sodium bentonite, namely, its marked swelling in water and formation of substantially permanent sols therein, which are typical of emulsiods, its sensitivity to electrolytes typical of suspensiods, and the scavenging capacity of the flocs which it forms by interaction of its hydrated, dispersed particles with ionizable substances.

The essence of my invention consists in addition to sewage of sodium bentonite—either in the dry state or in the form of a hydrosol—and thereafter flocculating the bentonite within the body of the sewage to be purified; the flocs, in the course of their formation and growth, agglutinating or entraining suspended as well as colloidally dispersed matter making up impurities in the sewage.

The pH of an average raw sewage is about 7.5. This pH value is not changed appreciably by addition of sodium bentonite in the practice of my invention. Much of the colloidal organic matter in sewage consists of protein bodies together with products of their bacterial and enzymic decomposition. At a pH in the neighborhood of 7.5, that is on the alkaline side of their isoelectric points—the particles of dispersed proteins and of their split products carry negative electric charges. This was shown years ago by Loeb to apply to proteins generally. It is well known also that the dispersed particles in clay suspensions, as well as in bentonite sols, carry negative charges. Therefore, the charges on clay particles cannot neutralize the charges of like sign on sewage dispersoids and lead to their flocculation. Consequently, ordinary hydrophobic, non-swelling clays are ineffective alone in purifying sewage. Bentonite, however, due to retention, when flocked, of large proportions of water of hydration, occupies a much greater effective volume, in proportion to the weight of original dry bentonite, than is the case with any other type of clay. The hydrous, water-cloaked flocs or webs, in circulating throughout the sewage, agglutinate, mop up or entrain suspended and colloidal dispersoids.

Hereinafter I shall use the term "sewage dispersoids" to include gross and microscopic suspended solids as well as colloidally dispersed material which make up the impurities in sewage, substantially all of the particles carrying negative electric charges.

In the practice of my invention I prefer to introduce the sewage to be treated in a large basin in which it remains quiescent for the purpose of settling of the floc. The highly colloidal clay is introduced into the liquid in any suitable way. I prefer, however, to introduce it in the form of a sol. Thus, I may prepare a slurry of the highly colloidal clay with water to make a sol or suspension containing around 5% or more of the clay. This sol is added to the sewage in the basin, for example in amounts corresponding to between 50 and 200 parts of clay per million parts of sewage. This suspension may be added to the incoming sewage flowing into the basin or it may be added directly to the liquid in the basin. The sewage is allowed to remain quiescent after the sol is admixed therewith, for a suitable period, for example, about four to six hours. Sewage normally contains sufficient ionizable substances so that the sol is flocculated almost immediately. The flocs grow or become larger and visible to the naked eye. In so growing the flocs apparently enclose particles of solid material or colloidal material. As the flocs become larger they settle to the bottom of the basin and their downward movement through the liquid effectively contacts various suspended and colloidal matters and causes their sedimentation.

In the rare case that the sewage does not contain sufficient ionizing substances, that is, in the case of a severe rain storm where the rain water is mixed with the sewage, it may be necessary to add a certain amount of salt, lime, or other ionizable material. After the floc is completely settled the clear liquid thereabove may be drawn off and passed to natural water courses. The sediment, which includes both floc and the precipitated solid and colloidal materials of the sewage, may be drawn off sepaartely from the basin, thickened in any suitable way, and subjected to digestion or to any other disposal process. The sol of highly colloidal clay which I add to the sewage may be in any desired concentration. Ordinarily a sol containing about 5% of clay is suitable. The sol should be made up with water which contains a relatively small amount of ionizable materials and in case the water available contains substantial quantities of ionizable materials, the sol should be prepared as shortly before use as practicable. It is, of course, desirable that the sol should floc and that the floc should occur within the sewage being treated.

I have found that this remarkably simple treatment of sewage effects a purification which is comparable to that attained by well known processes of sewage purification, for example, the trickling filter process and the activated sludge process. The degree of purification depends to a considerable extent upon the amount of floc produced, which in turn for any particular sample of clay depends upon the amount of clay employed. Thus, with sewage having an average B. O. D. of 373 parts per million, after treatment in the manner described above, with 50 parts of bentonite per million, gave a B. O. D. of 88 parts per million. With 60 parts of bentonite per million the B. O. D. was reduced to 75 parts per million. With 70 parts of bentonite per million the B. O. D. was reduced to 61 parts per million. With 80 parts of bentonite per million the B. O. D. was reduced to 50 parts per million. With 100 parts per million the B. O. D. was reduced to 26 parts per million. This corresponds with a B. O. D. reduction of approximately 93%. Consequently, increasing the amount of bentonite employed to 200 parts of bentonite per million of sewage decreased the B. O. D. only slightly, for example, to around 15, which was a reduction of 96%. The degree of purification necessary depends upon the disposal which is to be made of the effluent. In some cases an effluent with a B. O. D. of around 50 parts per million can be disposed of, without objection, in which case a dosage of about 30 parts of bentonite per million should be used.

By the term "sewage" employed herein, I intend to designate not only residential sewage, but also industrial and trade wastes of various kinds. Furthermore, I use the term "sewage" broadly to include not merely raw sewage and wastes, but also treated and partially treated sewage and wastes and also effluents therefrom.

Although the invention has been disclosed in connection with the specific details of a preferred embodiment thereof, it must be understood that such details are not intended to be limitative of the invention except in so far as set forth in the accompanying claim.

Having thus described my invention, what I claim as new and desire to secure by Letters Patent of the United States is:

The process of treating sewage which comprises separately adding thereto, and dispersing therein, ionizable material and a slurry of sodium bentonite, thereby causing the bentonite to react with ionizable substances present in said sewage, and with the ionizable material added thereto, to form hydrous flocs and to entrain sewage dispersoids, waiting for the flocs and entrained material to settle, and separating the supernatant liquid therefrom.

HUBERT L. OLIN.